(12) United States Patent
Caraccio et al.

(10) Patent No.: US 10,705,963 B2
(45) Date of Patent: Jul. 7, 2020

(54) LATENCY-BASED STORAGE IN A HYBRID MEMORY SYSTEM

(71) Applicant: Micron Technology, Inc., Boise, ID (US)

(72) Inventors: Danilo Caraccio, Milan (IT); Emanuele Confalonieri, Lesmo (IT); Marco Dallabora, Melegnano (IT); Roberto Izzi, Caserta (IT); Paolo Amato, Treviglio (IT); Daniele Balluchi, Cernusco Sul Naviglio (IT); Luca Porzio, Casalnuovo di Napoli (IT)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 15/927,530

(22) Filed: Mar. 21, 2018

(65) Prior Publication Data

US 2019/0294547 A1    Sep. 26, 2019

(51) Int. Cl.
*G06F 3/06*      (2006.01)
*G06F 12/0862*   (2016.01)
*G06F 12/10*     (2016.01)

(52) U.S. Cl.
CPC .......... *G06F 12/0862* (2013.01); *G06F 3/064* (2013.01); *G06F 3/068* (2013.01); *G06F 3/0611* (2013.01); *G06F 3/0647* (2013.01); *G06F 3/0679* (2013.01); *G06F 12/10* (2013.01); *G06F 2212/602* (2013.01)

(58) Field of Classification Search
CPC .... G06F 3/068; G06F 3/0685; G06F 12/0638; G06F 2212/205; G06F 2212/217
See application file for complete search history.

(56) References Cited

U.S. PATENT DOCUMENTS

| | | | |
|---|---|---|---|
| 8,307,151 B1* | 11/2012 | Caraccio | G06F 12/0223 711/103 |
| 8,452,912 B2 | 5/2013 | Lee et al. | |
| 8,725,963 B1 | 5/2014 | Emelianov et al. | |
| 9,772,776 B2 | 9/2017 | Tsirkin | |
| 9,922,060 B2 | 3/2018 | Petculescu | |
| 9,977,733 B2* | 5/2018 | Takeuchi | G06F 12/0246 |
| 10,152,428 B1* | 12/2018 | Alshawabkeh | G06F 11/3034 |
| 2008/0126716 A1* | 5/2008 | Daniels | G06F 12/0875 711/154 |

(Continued)

FOREIGN PATENT DOCUMENTS

KR    10-2008-0067548 A    7/2008
KR    10-2013-0112800 A    10/2013

OTHER PUBLICATIONS

KeunSoo Yim. "A Novel Memory Hierarchy for Flash Memory Based Storage Systems." Dec. 2005. Journal of Semiconductor Technology and Science. vol. 5. pp. 262-269. (Year: 2005).*

(Continued)

*Primary Examiner* — Nathan Sadler
(74) *Attorney, Agent, or Firm* — Brooks, Cameron & Huebsch, PLLC (57) ABSTRACT

An example apparatus comprises a hybrid memory system and a controller coupled to the hybrid memory system. The controller may be configured to cause data to be selectively stored in the hybrid memory system responsive to a determination that an exception involving the data has occurred.

21 Claims, 5 Drawing Sheets

(56) References Cited

U.S. PATENT DOCUMENTS

| | | | |
|---|---|---|---|
| 2009/0193184 A1* | 7/2009 | Yu | G06F 12/0246 |
| | | | 711/103 |
| 2010/0169602 A1* | 7/2010 | Hulbert | G06F 12/0246 |
| | | | 711/165 |
| 2010/0217924 A1 | 8/2010 | Panabaker et al. | |
| 2011/0167197 A1* | 7/2011 | Leinwander | G06F 12/0246 |
| | | | 711/103 |
| 2012/0137055 A1* | 5/2012 | Lee | G06F 12/0223 |
| | | | 711/103 |
| 2013/0080693 A1* | 3/2013 | Kim | G06F 12/0246 |
| | | | 711/105 |
| 2014/0013025 A1 | 1/2014 | Venkata | |
| 2014/0325169 A1* | 10/2014 | Iyigun | G06F 3/068 |
| | | | 711/162 |
| 2015/0106582 A1* | 4/2015 | Mai | G06F 3/0649 |
| | | | 711/165 |
| 2015/0212741 A1* | 7/2015 | Lee | G06F 3/0613 |
| | | | 711/114 |
| 2016/0077968 A1 | 3/2016 | Sela et al. | |
| 2016/0202936 A1* | 7/2016 | Lesartre | G06F 12/121 |
| | | | 711/133 |
| 2016/0217835 A1* | 7/2016 | Blott | G11C 7/1057 |
| 2016/0291888 A1* | 10/2016 | Budiman | G06F 3/0619 |
| 2017/0161184 A1* | 6/2017 | Colgrove | G06F 12/023 |
| 2017/0286296 A1* | 10/2017 | Mukherjee | G06F 12/1063 |
| 2017/0344300 A1* | 11/2017 | Chang | G06F 12/0246 |
| 2018/0024750 A1* | 1/2018 | Hassan | G06F 3/064 |
| | | | 711/105 |
| 2018/0024754 A1* | 1/2018 | Hassan | G06F 12/08 |
| | | | 711/170 |
| 2018/0024923 A1* | 1/2018 | Hassan | G06F 9/5016 |
| | | | 711/203 |
| 2018/0046378 A1* | 2/2018 | Coburn | G06F 12/1009 |
| 2018/0129424 A1* | 5/2018 | Confalonieri | G06F 3/0611 |
| 2018/0232173 A1* | 8/2018 | Chung | G06F 3/0647 |
| 2018/0260323 A1* | 9/2018 | John | G06F 12/08 |
| 2018/0373626 A1* | 12/2018 | Sun | G06F 12/0246 |

OTHER PUBLICATIONS

Hsu et al. "I/O Reference Behavior of Production Database Workloads and the TPC Benchmarks—An Analysis at the Logical Level." Mar. 2001. ACM. ACM Transactions on Database Systems. pp. 96-143. (Year: 2001).*

Ramos et al. "Page Placement in Hybrid Memory Systems." Jun. 2011. ACM. ICS'11. pp. 85-95. (Year: 2011).*

Fong et al. "Phase-Change Memory—Towards a Storage-Class Memory." Nov. 2017. IEEE Transactions on Electron Devices. vol. 64. pp. 4374-4385.*

International Search Report and Written Opinion in related International Application No. PCT/US2019/022665, dated Jun. 28, 2019, 13 pages.

* cited by examiner

LATENCY-BASED STORAGE IN A HYBRID MEMORY SYSTEM

TECHNICAL FIELD

The present disclosure relates generally to semiconductor memory and methods, and more particularly, to apparatuses and methods related to a hybrid memory system.

BACKGROUND

Memory devices are typically provided as internal, semiconductor, integrated circuits in computing systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions and store the results of the executed instructions to a suitable location. A processing resource can comprise a number of functional units such as arithmetic logic unit (ALU) circuitry, floating point unit (FPU) circuitry, and a combinatorial logic block, for example, which can be used to execute instructions for operation of the computing system.

A number of components in a computing system may be involved in providing instructions to the functional unit circuitry for execution. The instructions may be executed, for instance, by a processing resource such as a controller and/or host processor. Furthermore, as different types of operations may be executed in one or multiple clock cycles through the functional unit circuitry, intermediate results of the instructions and data may also be sequenced and/or buffered.

DETAILED DESCRIPTION

The present disclosure includes apparatuses and methods related to a hybrid memory system. An example apparatus includes a hybrid memory system to couple to a host and a controller coupled to the hybrid memory system. The controller may be configured to assign a sensitivity to a command and cause the command to be selectively diverted to the hybrid memory system based, at least in part, on the assigned sensitivity.

Computing systems such as personal computers, laptops, tablets, phablets, smartphones, Internet-of-Things (IoT) enabled devices, etc., may include one more memory resources to store data and/or instructions associated with the computing system. As used herein, "IoT enabled devices" include physical devices, vehicles, home appliances, and other devices embedded with electronics, software, sensors, actuators, and/or network connectivity which enables such objects to connect and exchange data. Examples of IoT enabled devices include wearable technologies, smart home devices, intelligent shopping systems, and monitoring devices, among other cyber-physical systems. In addition, computing systems may include one or more processing resources to execute system software such an operating system to provide common services for applications running on the computing system. Examples of operating systems include Linux®, Unix®, Windows®, etc.

During operation, the computing system may execute instructions such as firmware, computer code, meta-code, framework files, etc. to provide functionality to the computing system. At least some of these instructions may be executed more frequently than other instructions, and/or at least some of these instructions may be executed at particular times of operation of the computing system.

For example, if the computing system attempts to read a same portion of the instructions multiple times, an exception (e.g., a fault) may occur. In some approaches, instructions that generate such exceptions may be loaded into a cache associated with the computing system via a readahead mechanism (or other suitable prefetch mechanism) to reduce the amount of time the computing system uses in accessing the instructions multiple times. Although prefetching instructions that have experienced an exception (or are likely to experience and exception) may reduce the amount of time the computing system uses in accessing the instructions multiple times, the caches utilized in such approaches are generally not as fast as other memory resources.

In some embodiments, an exception such as a page fault may occur when a program (e.g., an application) deployed in a user space and/or a kernel service or library attempts to access an instruction stored in an internal cache associated with the computing system or a processor of the computing system and the instruction is not present in a memory (e.g., a RAM) of the computing system when the attempt to access the instruction occurs. Such exceptions may be remedied by accessing a storage device on which the instruction is stored and loading pages of memory associated with the instruction from the storage device. If readahead operations are conducted by the computing system, such exceptions may be remedied by loading contiguous of memory associated with the instructions from the storage device.

As another example, if physical memory resources become over-utilized, for example, when multiple processes are executed in virtual memory, the instructions may be mapped to physical memory (e.g., physical pages of memory) prior to execution. However, if there is insufficient physical memory to map the instructions to, the physical memory resources may become over-utilized, which may result in decreased computing system performance and/or increased read/write times for the computing system.

In yet another example, certain write patterns may be common when the computing system is operating. For example, certain instructions may exhibit repetitive and/or predictable write patterns; however, in some approaches, information regarding these write patterns may not be accessible to the computing system. As a result, in some approaches, time and/or processing resources may be consumed in repetitively fetching and writing instructions that have repetitive and/or predictable read or write patterns.

In contrast, embodiments herein may reduce an amount of time and/or an amount of processing resources consumed in addressing exceptions that occur when an instruction is accessed multiple times, may provide an increase in computing speed and/or read/write times for a computing system utilizing virtual memory addressing, and/or may alleviate time and/or processing resources consumed by a computing system in repetitively fetching instructions that exhibit repetitive and/or predictable read or write patterns.

For example, in some embodiments, one or more memory resources associated with the computing system may be deployed in the form of a hybrid storage device. For example, at least one memory resource may comprise a particular type of memory resource while at least one other memory resource may comprise a different particular type of memory resource. As a non-limiting example, one memory resource associated with the computing system may be a non-volatile memory resource such as a 3D Xpoint non-volatile memory, and a second memory resource may be a different non-volatile memory resource such as a flash memory (e.g., a storage volume). Embodiments are not limited to these specific examples; however, and the memory resources that comprise the hybrid storage device may include combinations of other types of non-volatile memory (e.g., ROM, PROM, EPROM, EEPROM, NVRAM, etc.) and/or volatile memory (e.g., RAM, DRAM, SRAM, etc.).

In some embodiments, as described in more detail herein, instructions that are determined to exhibit certain characteristics may be stored and/or accessed from the first memory resource or the second memory resource. For example, in some embodiments, certain instructions may be stored and/or accessed from the first memory resource responsive to a determination that a lower latency may be realized by the computing system if the instructions are stored and/or accessed from the first memory resource.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, designators such as "N," etc., particularly with respect to reference numerals in the drawings, indicate that a number of the particular feature so designated can be included. As used herein, "a number of" a particular thing refers to one or more of such things (e.g., a number of memory arrays can refer to one or more memory arrays). A "plurality of" is intended to refer to more than one of such things.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
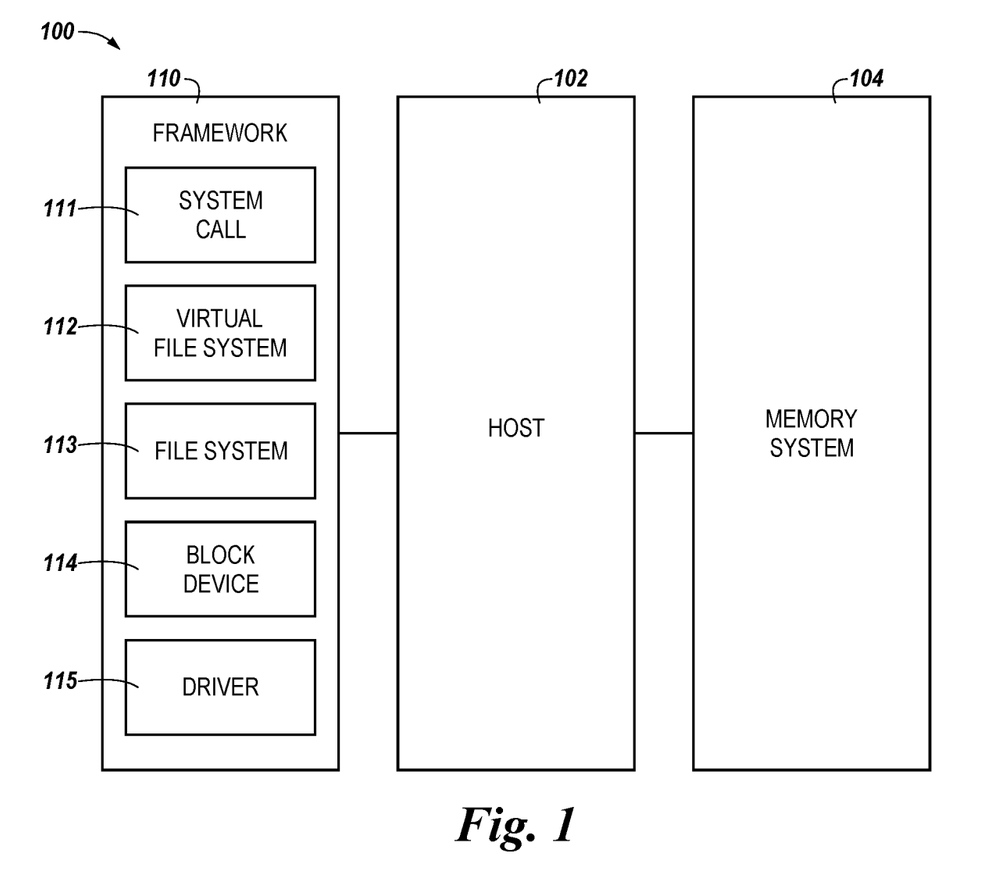
FIG. 1 is a block diagram of an apparatus in the form of a computing system including a framework, host, and memory system in accordance with a number of embodiments of the present disclosure.

FIG. 1 is a block diagram of an apparatus in the form of a computing system 100 including a framework 110, host 102, and memory system 104 in accordance with a number of embodiments of the present disclosure. As used herein, a framework 110, host 102, and/or memory system 104 might also be separately considered an "apparatus." In some embodiments, the memory system 104 may be a hybrid memory system as described in connection with FIG. 2.

Figure 2:
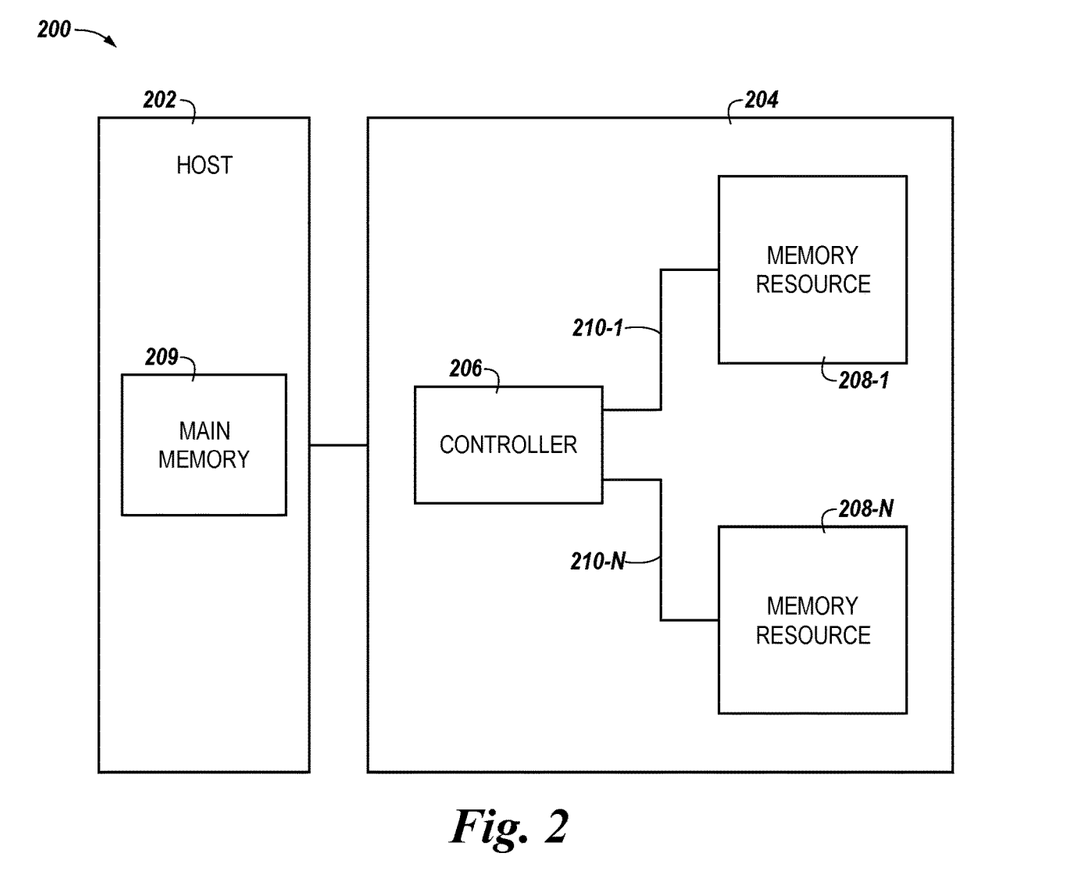
FIG. 2 is a block diagram of an apparatus in the form of a computing system including a host including a main memory, and memory system in accordance with a number of embodiments of the present disclosure.

System 100 includes a host 102 coupled (e.g., connected) to memory system 104, which includes one or more memory resources, as illustrated in FIG. 2, herein. Host 102 can be a host system such as a personal laptop computer, a desktop computer, a digital camera, a smart phone, a memory card reader, IoT enabled device, among various other types of hosts. Host 102 can include a system motherboard and/or backplane and can include a number of processing resources (e.g., one or more processors, microprocessors, or some other type of controlling circuitry). The system 100 can include separate integrated circuits or both the host 102 and the memory system 104 can be on the same integrated circuit. The system 100 can be, for instance, a server system and/or a high performance computing (HPC) system and/or a portion thereof.

For clarity, the system 100 has been simplified to focus on features with particular relevance to the present disclosure. The memory system 104 can include one or memory resources such as a DRAM array (e.g., a 2T2C DRAM array, a 3T DRAM array, etc.), FeRAM, SRAM array, STT RAM array, PCRAM array, TRAM array, RRAM array, NAND flash array, 3D Xpoint memory, NOR flash array, and/or a storage sub-system that includes a controller, a 3D Xpoint memory portion and a NAND flash portion, for instance.

The framework 110 may include instructions executable by a processing resource associated with the host 102 to facilitate operation of the system 100. For example, the framework may include instructions executable by the processing resource of the host 102 to control computing operations such as reads, writes, opens, closes, etc., to provide one or more file systems (e.g., a virtual file system, a file system such as an extended file system, etc.), and/or one or more instructions corresponding to a block device. In some embodiments, the framework 110 may be a Linux® framework such as an Android® framework. In addition, the framework 110 may include drivers (e.g., one or more software drivers) executable to allow an operating system running on the host 102 to communicate with one or more devices coupled to the host 102.

In some embodiments, the framework 110 may represent an operating system. For example, the framework 110 may represent an operating system having a Linux® kernel associated therewith. In such embodiments, the framework 110 may be considered a "software storage stack" (e.g., the framework 110 may represent a software-based kernel implementation of an operating system). Accordingly, the framework 110 may have one or more memory resources associated therewith to store instructions executable to operate the computing system 100 and/or the framework 110 may include virtualized memory resources on which the instructions utilized by the framework 110 for operation of the computing system 100 are stored. Embodiments are not so limited; however, and the instructions utilized by the framework 110 may be stored in, and/or accessed from the memory system 104, or a main memory of the host as described in further detail, herein.

As described above, the framework 110 may include various components configured to perform certain tasks and/or operations. For example, the framework 110 may include a system call component 111, a virtual file system component 112, a file system component 113, a block device component 114, and/or driver component 115.

The system call component 111 may include instructions executable by a processing resource (e.g., a processing resource associated with the host) and/or may be provisioned with hardware resources on which the instructions may ultimately be executed to request one or more services from the kernel of the operating system the instructions are to be executed on. In some embodiments, the system call component 111 may be accessed via an application programming interface. When implemented, the instructions associated with the system call component 111 may transfer control of the computing system 100 from user space to kernel space. In some embodiments, this transfer of control may occur in response to a software interrupt.

The virtual file system component 112 may include instructions executable by a processing resource (e.g., a processing resource associated with the host) and/or may be provisioned with hardware resources on which the instructions may ultimately be executed to provide an abstraction layer on top of the file system component 113. For example, the virtual file system component 112 may include instructions that may be executed to access local and/or network storage devices. In some embodiments, the virtual file system 112 may include instructions that may be executed to access local and/or network storage devices transparently (e.g., without a client application interaction). The instructions associated with the virtual file system component 112 may specify an interface between the kernel and the file system component 113.

The file system component 113 may include instructions executable by a processing resource (e.g., a processing resource associated with the host) and/or may be provisioned with hardware resources on which the instructions may ultimately be executed to control how data associated with the computing system 100 is stored and/or retrieved. For example, the file system component 113 may include instructions executable to store and/or retrieve data from the memory system 104, as discussed in more detail herein.

The block device component 114 may store instructions executable by a processing resource (e.g., a processing resource associated with the host) and/or may be provisioned with hardware resources on which the instructions may ultimately be executed to reference a particular memory location or memory locations associated with the computing system 100. In some embodiments, the block device component 114 may comprise a hard disk drive and/or Solid State Drive which may provide buffered access to the computing system 100. For example, the instructions associated with the block device component 114 may be executed to provide access to a device (e.g., the memory system 104) associated with the computing system 100.

The driver component 115 may include instructions executable by a processing resource (e.g., a processing resource associated with the host) and/or may be provisioned with hardware resources on which the instructions may ultimately be executed to provide driver support for various components associated with the computing system 100. For example, the driver component 115 may be configured to execute instructions to load and/or update drivers associated with the host 102, memory system 104, and/or other peripheral devices (not shown) that may be associated with the computing system 100.

In some embodiments, the various components of the framework 110 may be exhibit different access patterns, at least some of which may exhibit predictable and/or repetitive behavior, as described in more detail, herein. Accordingly, embodiments described herein may allow for a hybrid storage system to facilitate management of the various components and/or access patterns associated with the various components of the framework 110, host 102, and/or memory system 104.

The framework 110 may be coupled to the memory system 104 via the host 102. For example, the host 102 may include one or more processing resources (e.g., computer processors such as a central processing unit and/or other computer processors) configured to execute the instructions (e.g., the instructions associated with the system call component 111, the virtual file system component 112, the file system component 113, the block device component 114, and/or the driver component 115) stored in the framework 110.

FIG. 2 is a block diagram of an apparatus in the form of a computing system 200 including a host 202 including a main memory 209, and memory system 204 (e.g., a hybrid memory system) in accordance with a number of embodiments of the present disclosure. The main memory 209 may be volatile memory such as RAM, DRAM, SRAM, etc. that may be used to store one or more pages of data associated with operation of the computing system 200. Embodiments are not limited to volatile memory; however, and the main memory may include non-volatile memory in addition to volatile memory or in lieu thereof.

As illustrated in FIG. 2, the hybrid memory system 204 may include one or more memory resources 208-1, ... 208-N coupled to a controller 206. As shown in FIG. 2, the controller 206 is communicatively coupled to the memory resources 208-1, ... 208-N via respective communication channels 210-1, ... 210-N. The communication channels 210-1, ... 210-N may allow for data and/or commands to be transferred between the controller 206 and the memory resources 208-1, ... 208-N. In various embodiments, the controller 206 is responsible for causing instructions from the framework (e.g., framework 110 illustrated in FIG. 1) and/or host 202 to be executed, and/or sequencing access to the memory system 204.

The controller 206 can be a state machine, sequencer, or some other type of controller, and include hardware and/or firmware (e.g., microcode instructions) in the form of an application specific integrated circuit (ASIC), field programmable gate array, etc. The controller 206 can control, for example, access patterns of instructions executed to facilitate operation of the computing system 200. As used herein, a host 202, memory system 204, controller 206, and/or memory resources 208-1, ... 208-N might also be separately considered an "apparatus."

In some embodiments, the memory system 204 may be a hybrid storage system and may include one or more memory resources 208-1, ... 208-N. The memory resources 208-1, ... 208-N may be different kinds of memory resources. For example, memory resource 208-1 may be an emerging non-volatile memory resource such a 3D Xpoint memory resource, Ferroelectric RAM (FeRAM), etc. while the memory resource 208-N may be a NAND memory resource. Embodiments are not limited to these specific examples, and the memory resource 208-1 and/or the memory resource 208-N may comprise other suitable types of memory resources.

During operation of the computing system 200, the memory system 204 may be utilized for code paging. As used herein, "code paging" is a memory management scheme by which the computing system 200 stores and retrieves data from the memory system 204 for use by the main memory 209 (e.g., system memory) of the host 202. In some embodiments, instructions executable to facilitate code paging, which may be stored in the main memory 209 of the host 202, may be executed as part of operation of the computing system 200.

However, during operation of the computing system 200, multiple instructions (e.g., an instruction to store and/or retrieve data from the main memory 209) to access a same portion of the main memory 209 may be executed. This may lead to an exception (e.g., a fault) being generated by the computing system 200. In some embodiments, a program may access data and/or instructions that are not mapped into the main memory 209 of the computing system 200. In this case, the data and/or instructions may be accessed from the memory system 204 thereby handling a page fault that occurs as a result of the data and/or instructions not being accessible from the main memory 209. In some approaches, this exception may be handled (e.g., remedied) by providing read and/or write access to a memory location other than the main memory 209. For example, in some approaches, a readahead mechanism may be utilized to prefetch sets of instructions that have experienced an exception and store them in a cache associated with the computing system 200 and/or the host 202 for subsequent execution.

Such exceptions may be very common in operation of the computing system 200. For example, in multiprocessing computing environments, and may generate a very large quantity of read and/or write data—in some examples up to hundreds of gigabytes per day. In some embodiments, in order to alleviate the processing resources and/or time consumed in read/write operations that may lead to an exception being generated, it may be beneficial to store instructions that generate a threshold number of exceptions in a memory resource (e.g., memory resource 208-1) to reduce read/write latencies and to reduce an amount of processing resources consumed in prefetching sets of instructions as occurs in utilization of a readahead mechanism.

For example, in some embodiments, the controller 206 may be configured to determine that an exception corresponding to a read or write access request for a particular set of data is going to occur (or has occurred), and cause the particular set of data to be written to the memory resource 208-1 for subsequent execution and/or retrieval by the computing system 200. In some embodiments, the particular set of data may be stored in a partition or LBA block in the memory resource 208-1. The partition and/or LBA block may be allocated (e.g., reserved) such that data other than the particular data (e.g., data not corresponding to the read or write access request) is not stored in the partition and/or LBA block, as described in more detail in connection with FIGS. 3A, 3B, and 3C, herein.

As described above, the main memory 209 of the host may be a physical memory resource such as a volatile memory resource (e.g., RAM, DRAM, SRAM, etc.), non-volatile memory resource (e.g., a HDD, flash memory, ferroelectric RAM, etc.), or combinations thereof. As a result, the amount of data that can be stored in the main memory 209 may be limited due the physical nature of the main memory 209. For example, the main memory 209 may include a finite amount of space in which data may be stored.

Accordingly, under some operating conditions, the main memory 209 may become full and/or may exhibit decreased performance when the host 202 attempts to store too much data in the main memory 209. This may be further exacerbated in systems that utilize virtual memory techniques to abstract memory resources (e.g., main memory 209) to create an illusion that the amount of memory space is greater than the actual amount of physical memory space defined by the main memory 209.

In such implementations, virtual address spaces may be managed (e.g., by control circuitry such as a memory management unit associated with the host 202) using logical to physical addressing techniques. For example, virtual addresses may be assigned to corresponding physical addresses, which may correspond to a physical location (e.g., one or more pages of memory, etc.) of the main memory 209 on which a processes may be ultimately executed on. However, when multiple virtual memory addresses are mapped to a same physical memory address, the computing system 200 may experience decreased performance and/or may hang (e.g., processes may be terminated and/or may behave unexpectedly).

For example, in computing implementations that utilize virtual memory techniques, one or more processes may reference one or more virtual memory locations (e.g., memory pages, memory blocks, etc.) that may be mapped onto physical memory locations of the main memory 209. Further, when the main memory 209 is full, virtual memory pages may not be able to be called since there are inadequate physical memory resources available to execute the process.

In some approaches, this may be alleviated by transferring pages of data in the main memory 209 to a swap space to free up physical memory resources of the main memory 209.

For example, in some approaches, the kernel of the operating system may include a mechanism to free physical memory resources of the main memory 209 allocated for anonymous pages. As used herein, "anonymous pages" are pages of memory that do not have an associated file. For example, an anonymous page may be a page of memory that is not backed by a file (e.g., a page of memory that does not have a file specified). However, although, an anonymous page may not be related to a file, an anonymous page may be related to a process and/or a process working set. Non-limiting examples of processes and process working sets include data structures such as heaps, stacks, constants, etc. As used herein, a process working set includes one or more pages of data in a virtual address space of the host that are stored in physical memory of the host such as the main memory of the host. For example, the process working set contains pages of memory that are visible to the main memory of the host (e.g., pages that have been recently referenced by the host).

In such approaches, the related contents of the page (e.g., the anonymous page) may be temporarily transferred (e.g., copied) to a swap space and/or a swap device. In the event that the page is subsequently referenced, the page may be transferred (e.g., copied) back to the main memory 209. However, due to the time and energy consumption associated with transferring the page from the main memory 209 to the swap space or sway device, and then subsequently transferring the page from the swap space or swap device back to the main memory 209, traditional swapping techniques may be less than desirable, especially in implementations where such techniques are repeatedly utilized. As used herein, a process working set includes one or more pages of data in a virtual address space of the host that are stored in physical memory of the host such as the main memory of the host. For example, the process working set contains pages of memory that are visible to the main memory of the host (e.g., pages that have been recently referenced by the host).

To facilitate selective transfer of data such as data corresponding to pages of memory, in some embodiments, a portion of the hybrid memory device 204 may configured to operate as a swap device (e.g., may be configured to allow for selective transfer of pages of memory to and from the portion of the hybrid memory system 204). For example, a portion of memory resource 208-1 may be configured to operate as a swap device such that pages of memory are selectively transferred to the portion of the memory resource 208-1. In some embodiments, one or more pages of memory of the memory resource 208-1 or one or more logical block addresses associated with the memory resource 208-1 may be allocated to perform swap operations as described in further detail in connection with FIG. 4. The one or more pages of memory and/or the one or more logical block addresses may be allocated when the hybrid memory system 204 is manufactured (e.g., before the hybrid memory system 204 is offered for sale to an end user), or the one or more pages of memory and/or the one or more logical block addresses may be allocated when the hybrid memory system 204 is initialized (e.g., when the computing system 200 is booted up). Embodiments are not so limited; however, and in some embodiments, the one or more pages of memory and/or the one or more logical block addresses may be allocated when the hybrid memory system 204 dynamically during runtime of the computing system 200.

In some embodiments, the portion of the hybrid memory system 204 that is allocated as a swap device may be a portion of the hybrid memory system 200 that has a lower access time than other portions of the hybrid memory system 200. For example, the memory resource 208-1 may have a lower access time than the memory resource 208-N due to the memory resource 208-1 being an emerging-type memory resource such as a 3D Xpoint memory resource. Further, in some embodiments, the portion of the hybrid memory system 204 that is allocated as a swap device may be a portion of the hybrid memory system 200 that has a higher endurance than other portions of the hybrid memory system 200.

In some embodiments, processes and/or applications executed by the host 202 may rely on a database management system (DBMS) such as NoSQL, SQLite, a cloud-based DBMS, or other suitable DBMS. The DBMS may allow an end user to create, read, update, and/or delete data in a database associated with the computing system 200. In some embodiments, the DMBS may operate according to a journaling policy, which may allow for data consistency and/or system durability to be realized. The DBMS may have commands associated therewith. In some embodiments, commands associated with the DBMS may be selectively diverted to a portion of the hybrid memory system based, at least in part, on a sensitivity assigned to the DBMS command.

The journaling system may be a journaling file system that keeps track of changes not yet committed to the file system (e.g., file system 113 illustrated in FIG. 1, herein). During operation of the computing system 200, the journaling system may incur multiple random writes that may put the memory system 204 and/or the main memory 209 under pressure. For example, the journaling system may incur multiple synchronous random and frequent writes that may over-utilize memory of the computing system 200 and/or the main memory 209 thereby putting the memory of the computing system 200 and/or the main memory under pressure.

These random and frequent writes may incur long latencies, especially in flash based memory systems, due to maintenance operations being performed in the foreground (e.g., during write command execution). These latencies may be further exacerbated in flash based memory systems under certain conditions such as when the flash based memory system is operating at or near capacity and/or when the flash based memory system has been operated for an extended period of time. In contrast, the hybrid memory system 204 may incur lower latencies than flash based memory systems over time and/or when the hybrid memory system 204 is operating at or near capacity.

In order to alleviate the deficiencies associated with flash based memory systems, some embodiments allow for the controller 206 to determine a sensitivity of command traffic handled by the DBMS and apply an indicator to certain types of command traffic based on the determined sensitivity of the traffic. The sensitivity of the command traffic may be based on characteristics of the command traffic such as the frequency of execution of a particular command, the size of the command, the amount of resources (e.g., memory resources and/or processing resources) execution of the command consumes, the speed at which the command may be executed, or other suitable sensitivity characteristics. In some embodiments, the sensitivity may be based on a write latency associated with execution of the command. In this example, the command may be selectively diverted to the hybrid memory system 204 responsive to a determination that the write latency associated with execution of the command exceed a threshold write latency.

Once the controller 206 has appended the indicator to a command, the command may be selectively diverted to an appropriate memory location of the computing system 200. For example, command traffic that is repetitive, random, and/or frequently executed (such as the synchronous small frequent and random writes incurred by the journaling system during operation of the computing system 200), may be selectively diverted to the hybrid memory device 204. In some embodiments, the command traffic may be selectively diverted based on the indicator to a particular memory resource (e.g., memory resource 208-1) of the plurality of memory resources 208-1, . . . 208-N associated with the hybrid memory system 204.

By selectively diverting certain portions of the command traffic to the hybrid memory system 204, lower latencies and/or increased performance may be realized in comparison to approaches in which the command traffic is either not selectively diverted or in approaches in which the command traffic is handled by a flash based memory system.

In some embodiments, the file system (e.g., virtual file system 112 illustrated in FIG. 1, file system 113 illustrated in FIG. 1) of the computing system 200 may be a flash file system such as a flash friendly file system (F2FS) or a journaling file system such as Ext4, although the file system(s) are not limited to these specific examples. The file systems may maintain their structure by specific metadata updates that are updated when a file is updated. For example, the file system of the computing system 200 may comprise data structures such as tables, trees, data arrays, etc., and may be updated when files associated therewith are updated to maintain the structure of the file system.

When the file system is updated (e.g., when metadata updates are applied to the file system in response to a file update), the updates are performed in small random writes. As described above, these types of small random writes may put the memory system 204 and/or the main memory 209 under pressure. These random writes may incur long latencies especially in flash based memory systems due to maintenance operations being performed in the foreground (e.g., during write command execution). These latencies may be further exacerbated in flash based memory systems under certain conditions such as when the flash based memory system is operating at or near capacity and/or when the flash based memory system has been operated for an extended period of time. In contrast, the hybrid memory system 204 may incur lower latencies than flash based memory systems over time and/or when the hybrid memory system 204 is operating at or near capacity.

For example, in some embodiments, command traffic associated with file system updates (e.g., files system metadata updates) may be selectively diverted to an appropriate memory location of the computing system 200. In some embodiments, the appropriate memory location of the computing system 200 may be a portion of the hybrid memory system 204, such as memory resource 208-1. In some embodiments, the controller 206 may be configured to cause the file system updates to be selectively diverted to the portion of the hybrid memory system 204.

By selectively diverting file system writes to the hybrid memory system 204, lower latencies and/or increased performance may be realized in comparison to approaches in which the file system writes are either not selectively diverted or in approaches in which the file system writes are handled by a flash based memory system.

During operation of the computing system 200, certain file systems (e.g., virtual file system 112 illustrated in FIG. 1, file system 113 illustrated in FIG. 1) may exhibit repetitive and/or predictable write patterns. For example, F2FS checkpoints and/or the journaling system may repeatedly write certain commands and/or data in a predictable manner. These commands and/or data may be written in small random writes, as described above.

As described above, these small random writes may incur long latencies especially in flash based memory systems due to maintenance operations being performed in the foreground (e.g., during write command execution). These latencies may be further exacerbated in flash based memory systems under certain conditions such as when the flash based memory system is operating at or near capacity and/or when the flash based memory system has been operated for an extended period of time. In contrast, the hybrid memory system 204 may incur lower latencies than flash based memory systems over time and/or when the hybrid memory system 204 is operating at or near capacity.

In order to alleviate the deficiencies associated with flash based memory systems some embodiments allow for selective diversion of small random writes to a portion of the hybrid memory system 204. For example, the computing system 200 (or portions thereof) may be configured to determine a source of a write operation (e.g., a small, random writes). In some embodiments, a file system associated with the computing system 200 and/or drivers associated with the computing system 200 may be configured to associate a hint (e.g., an indicator to) metadata writes and/or data structures. The hint may be transferred into a write command, and the write command including the hint may be transferred to the hybrid memory system 204. In some embodiments, subsequent to the write command and hint associated therewith being transferred to the hybrid memory system 204, the controller 206 may be further configured to divert such file system writes (or metadata writes) to the hybrid memory system 204 to reduce access times and/or to avoid endurance its to the main memory 209, thereby increasing performance of the computing system 200.

In some embodiments, the controller 206 may be configured to selectively divert file system writes to portions of the hybrid memory system 204 that are best suited to handling the command traffic diverted thereto. For example, certain file systems may exhibit particular command traffic patterns, which may be handled most efficiently by particular types of memory. As a non-limiting example, in F2FS, Log-structured File System (LFS) writes may be executed in a determinable access pattern wherein data is sequentially written on unmapped LBAs, which may be well suited to NAND memory. In contrast, Slack Space Recycle (SSR) writes may be executed in a determinable access pattern in which data is randomly written on mapped LBAs, which may be well suited to low latency memory such as 3D Xpoint memory.

Accordingly, in some embodiments, the controller 206 can selectively divert command traffic associated with determinable write patterns to a portion of the hybrid memory system 204 that is best suited to handling a particular type of file system writes. For example, the controller 206 may be configured to divert LFS writes to memory resource 208-N, which may be a NAND memory, and/or the controller 206 may be configured to divert SSR writes to memory resource 208-1, which may be a low latency emerging memory resource, as described herein.

In some approaches, it is not possible to transmit information corresponding to an access semantic to a memory device associated with the computing system 200. For example, in some approaches, information corresponding to whether a write access request is associated with user data or file system metadata is not transmitted to a memory device associated with the computing system 200. Therefore, in some approaches, the memory device associated with the computing system 200 may not be provided with any knowledge as to whether a particular LBA or LBA range will be frequently accesses by read or write commands if the particular LBA or LBA range is stored in a storage location in which paging processes are executed.

In contrast, embodiments herein allow for the controller 206 to determine whether a write access request is, for example, associated with user data or file system metadata and/or to determine whether a particular LBA or LBA range is frequently accessed by read or write commands and selectively divert read or write commands having particular properties to the hybrid memory system 204.

In some embodiments, the hybrid memory system 204 may be configured to operate according to the non-volatile memory express (NVMe) specification. For example, one or more of the memory resource 208-1, . . . 208-N of the hybrid memory system 204 may be configured to operate according to the NVMe specification. As will be appreciated, the NVMe specification provides certain functionalities to a non-volatile memory device such as hybrid memory system 204, as shown below in Table 1.

TABLE 1

| Feature | Description | NVMe Specification Version |
|---|---|---|
| LBA Range Type | Indicates the type and attributes of LBA ranges that are part of a specified namespace | 1.2.1 |
| Data Set Management Functions | Transmits information to command and/or data traffic that are associated with a particular quantity of LBAs | 1.2.1 |
| Directives (e.g., Streams) | Enables the host to indicate to the controller that specified logical blocks are part of a group of associated data | 1.3 |

In some embodiments, the functionalities described in Table 1 may facilitate an optimized integration of the hybrid memory system 204 with the computing system 200. For example, the LBA range type functionality of the NVMe specification may be utilized to indicate the type and/or attributes of LBA ranges that are part of a specified file system (e.g., namespace) such as the virtual file system 112 and/or the file system 113 illustrated in FIG. 1. In some embodiments, the type of LBA ranges may include RAID, page files, swap files, and/or may be vendor specific LBA range types. Further, the attributes of the LBA ranges may include semantics that are utilized to indicate whether the LBA range can be overwritten and/or whether the LBA range is visible or not to the operating system and/or BIOS of the computing system 200.

The data set management functions shown in Table 1 may be utilized to transmit information related to command and/or data traffic patterns that fall within a certain quantity of LBAs. For example, the data set management functions may include functions related to a command access size, write prepare, sequential write range, sequential read range, access latency, access frequency, etc. of data and/or command traffic patterns that fall within a certain quantity of LBAs. In some embodiments, the data set management functions may operate based on LBA ranges, read commands, and/or write commands.

The directives may include stream directives, which may enable the host 202 to provide an indication to the controller 206 that specified logical blocks in a write or read command are part of a single group of associated data. In addition, the directives may enable the exchange of metadata between the host 202 and the hybrid memory system 204. In some embodiments, the directives may facilitate the concurrent writing of data to the hybrid memory system 204, which may in turn facilitate the concurrent erasure of logical blocks of data that are written concurrently. This may minimize garbage collection operations and/or may lead to reduced write amplification in comparison to approaches in which directives are not utilized for reading or writing data to the hybrid memory system 204.

Figure 3A:
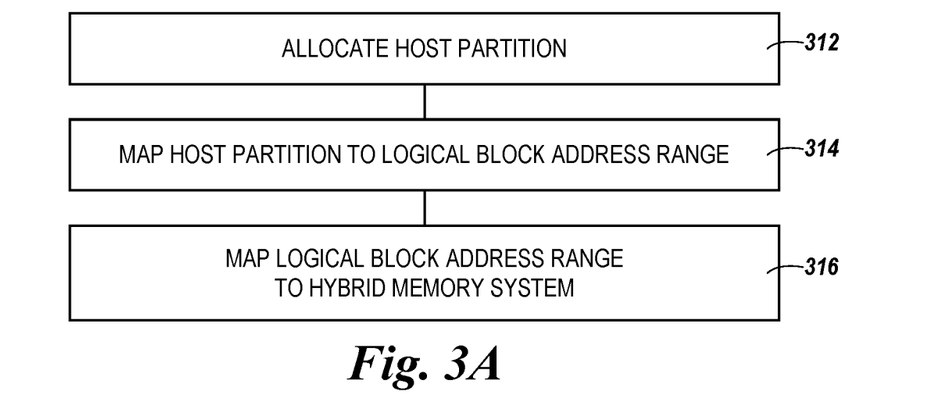
FIG. 3A illustrates an example flow diagram to map a logical block address range to a hybrid memory system in accordance with a number of embodiments of the present disclosure.

FIG. 3A illustrates an example flow diagram to map a logical block address range to a hybrid memory system in accordance with a number of embodiments of the present disclosure. At block 312, the computing system (e.g., computing system 200 illustrated in FIG. 2) may be configured to allocate a portion (e.g., a partition) of the main memory such as main memory 209 illustrated in FIG. 2, of the host (e.g., host 200 illustrated in FIG. 2) for use under certain operating conditions of the computing system. In some embodiments, the computing system may be configured to allocate a portion of the main memory of the host for paging processes and/or handling of exceptions (e.g., faults). In some embodiments, the controller (e.g., controller 206 illustrated in FIG. 2), or a controller associated with the host, may be configured to allocate the portion of the main memory for paging processes and/or handling of exceptions that occur during operation of the computing system.

For example, the computing system may be configured to allocate a page of memory, a portion of a page of memory, one or more blocks of memory, and/or a number of memory storage locations of the main memory for paging processes and/or handling of exceptions that occur during operation of the computing system. In some embodiments, the portion of the main memory that is allocated for paging processes and/or handling of exceptions that occur during operation of the computing system may be a logical partition of the main memory.

At block 314, the computing system may be configured to map the portion of the main memory that has been allocated for paging processes and/or handling of exceptions that occur during operation of the computing system to a LBA range associated with the hybrid memory system. For example, logical addresses associated with the allocated portion of the main memory may be mapped to a particular LBA range. In some embodiments, the LBA range may comprise a contiguous sequence of logical addresses that specify the location (e.g., the logical storage locations of the hybrid memory system) in which data associated with the paging processes and/or handling of exceptions are stored. In some embodiments, the controller (e.g., controller 206 illustrated in FIG. 2), or a controller associated with the host, may be configured to map the portion of the hybrid storage system to a particular LBA range that may be paged to the main memory when executed.

At block 316, the computing system may be configured to map the LBA range of the main memory to a portion of the hybrid memory system (e.g., hybrid memory system 204 illustrated in FIG. 2). The portion of the hybrid memory system to which the LBA range associated with the main memory is mapped may comprise a page (or portion of a page), a sub-section, one or more LBAs, a number of blocks, etc. of the hybrid memory system.

In some embodiments, the controller (e.g., controller 206 illustrated in FIG. 2), or a controller associated with the host, may be configured to map the LBA range associated with the man memory to the portion of the hybrid memory system. For example, the controller may be configured to allocate a portion of the hybrid memory system to store the mapped LBA range, which corresponds to the physical locations (e.g., the physical addresses) of memory used for paging processes and exception handling.

In some embodiments, the LBA range that is mapped to the hybrid memory system may be mapped to one of the memory resources (e.g., memory resources 208-1, . . . 208-N) that is a emerging non-volatile memory resource of the hybrid memory system. For example, the LBA range may be mapped to a memory resource of the hybrid memory system that is configured to exhibit a lower read (or write) latency than other memory resources of the hybrid memory system. By selectively mapping the LBA range to a memory resource of the hybrid memory system that exhibits a lower write or read latency than other memory resources of the hybrid memory system, performance of the computing system may be improved as described above in connection with FIG. 2.

Figure 3B:
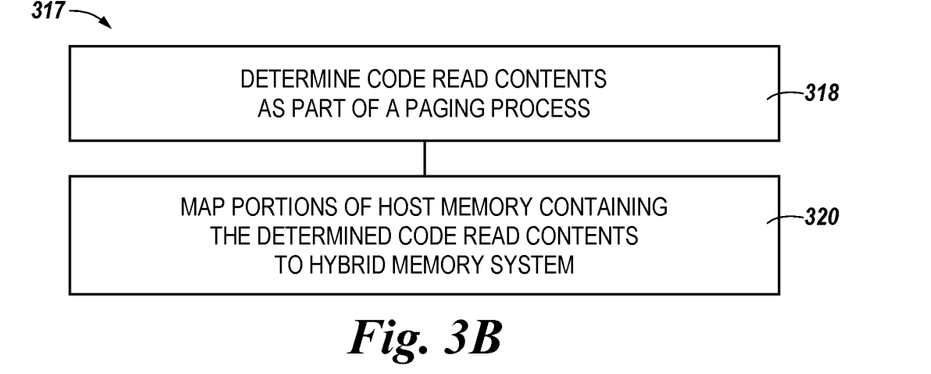
FIG. 3B illustrates an example flow diagram 317 to map portions of the hybrid memory system to host memory (e.g., main memory associated with the host) in accordance with a number of embodiments of the present disclosure.

FIG. 3B illustrates an example flow diagram 317 to map portions of the hybrid memory system to host memory (e.g., main memory associated with the host) in accordance with a number of embodiments of the present disclosure. In some embodiments, an operating system of the computing device may be able determine information corresponding to code files (e.g., application executable files, kernel dynamic libraries, etc.). The code files may be stored in a dedicated LBA range of the hybrid memory system of the computing device. If instructions related to the code files stored in the hybrid memory system are referenced and a page fault occurs, the LBA range of the hybrid memory system may be read. In some embodiments, the LBA ranges of the hybrid memory system that store the code files may be mapped onto a low latency portion of the hybrid memory system thereby facilitating code paging operations.

At block 318, the computing system may be configured to determine code read contents as part of a paging process. For example, the computing system may be configured to determine code read contents of the main memory as part of a paging process executed by the computing system. Embodiments are not limited to determining code read contents of the main memory as part of the paging process, however, and in some embodiments, the computing system may be configured to determine that a readahead operation has been executed (or is going to be executed) as described n more detail in connection with FIG. 2, herein. As used herein, "code read contents" are data associated with a file or a command that are utilized as part of a read operation of the computing system.

For example, the controller (e.g., controller 206 illustrated in FIG. 2), or a controller associated with the host, may be configured to recognize the data associated with a file or a command that is read (or will be read) as part of a paging process, or the controller (e.g., controller 206 illustrated in FIG. 2), or a controller associated with the host, may be configured to recognize readahead operations executed by the computing system, as described n more detail in connection with FIG. 2, herein.

At block 320, the computing system may be configured to map portions of the host memory (e.g., main memory 209 illustrated in FIG. 2) containing the determined code read contents to the hybrid memory system. In some embodiments, the portions of the host memory containing the determined code read contents may be mapped to an allocated portion of the hybrid memory system that is allocated (e.g., by the controller) to store data corresponding to the determined code read contents. For example, a portion of the hybrid memory system may be allocated to store an LBA range that corresponds to the determined code read contents.

In some embodiments, the portion of the hybrid memory system that is allocated to store an LBA range corresponding to the code read contents may be mapped to one of the memory resources (e.g., memory resources 208-1, . . . 208-N) that is a emerging non-volatile memory resource of the hybrid memory system. For example, the LBA range may be mapped to a memory resource of the hybrid memory system that is configured to exhibit a lower read (or write) latency than other memory resources of the hybrid memory system. By selectively mapping the LBA range to a memory resource of the hybrid memory system that exhibits a lower write or read latency than other memory resources of the hybrid memory system, performance of the computing system may be improved as described above in connection with FIG. 2.

Figure 3C:
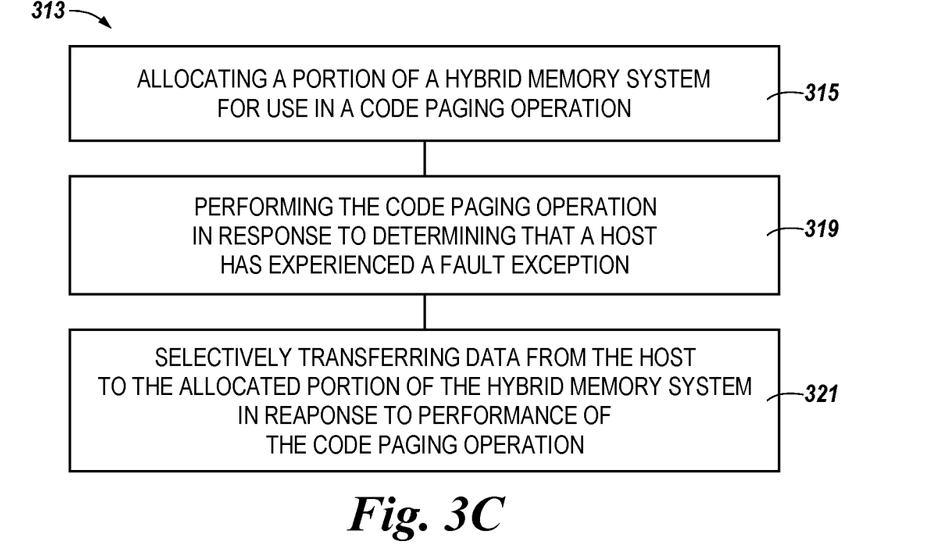
FIG. 3C illustrates an example flow diagram to selectively transfer data to a hybrid memory system in response to performance of a code paging operation.

FIG. 3C illustrates an example flow diagram 313 to selectively transfer data to a hybrid memory system in response to performance of a code paging operation. At block 315, a portion of a hybrid memory system may be allocated for use in a code paging operation. The portion of the hybrid memory system that is allocated for use in a code paging operation may be allocated at initialization of the computing system (e.g., at startup, reboot, etc.), or may be allocated dynamically during operating of the computing system (e.g., during runtime of the computing system), or may be allocated during manufacture of the hybrid memory system (e.g., prior to an end user purchasing the computing system or hybrid memory system).

The allocated portion of the hybrid memory system may be one or more pages of memory, one or more LBAs, and/or one or more blocks of memory. For example, the controller may be configured to allocate a particular LBA range of the hybrid memory system for use in a code paging operation. In some embodiments, the portion of the hybrid memory system that is allocated for use in a code paging operation may be a portion of the memory resource (e.g., memory resource 208-1, 208-N, etc. illustrated in FIG. 1) that exhibits a lowest access time among the memory resources of the hybrid memory system. For example, the portion of the hybrid memory system that is allocated for use in a code paging operation may be a portion of a memory resource (e.g., memory resource 208-1 illustrated in FIG. 2) of the hybrid memory system that is an emerging memory system (e.g., a portion of the hybrid memory system that is characterized by a lower access time and/or a higher endurance than a different portion of the hybrid memory system) as described above in connection with FIG. 2.

At block 319, the code paging operation may be performed in response to a determining that a host has experienced a fault exception. For example, the controller may be configured to determine that a fault exception has occurred. The fault exception may be experienced by the host or computing system, as described above in connection with FIG. 2.

At block 321, data may be selectively transferred from an allocated portion of the hybrid memory system to the host in response to performance of the code paging operation. For example, in some embodiments, the controller may be configured to determine that an exception corresponding to a read or write access request for a particular set of data is going to occur (or has occurred), and cause the particular set of data to be written to the memory resource (e.g., main memory of the host) for subsequent execution and/or retrieval by the computing system. In some embodiments, the particular set of data may be stored in a partition or LBA block in the memory resource. The partition and/or LBA block may be allocated (e.g., reserved) such that data other than the particular data (e.g., data not corresponding to the read or write access request) is not stored in the partition and/or LBA block. In some embodiments, the data may be selectively transferred to a particular logical block address range associated with the hybrid memory system.

In some embodiments, the controller may be configured to determine contents of a code read by the host as part of the code paging operation. Once the contents of the code read by the host are determined, the controller may be configured to selectively map portions of a memory of the host (e.g., a main memory of the host) to the allocated portion of the hybrid memory system. In some embodiments, the controller may be further configured to cause the data to be transferred from the allocated portion of the hybrid memory system back to the host in response to the controller determining that the host is referencing the transferred data.

Figure 4:
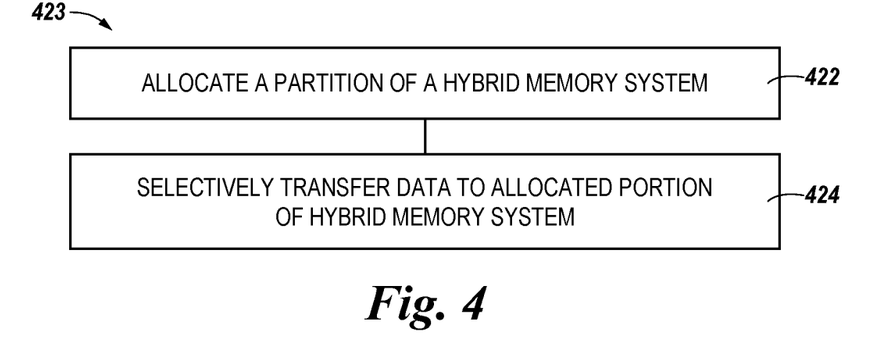
FIG. 4 illustrates an example flow diagram to selectively transfer command traffic to a hybrid memory system in accordance with a number of embodiments of the present disclosure.

FIG. 4 illustrates an example flow diagram 423 to selectively transfer data to a hybrid memory system in accordance with a number of embodiments of the present disclosure. At block 422, a portion of the hybrid memory system may be allocated. For example, a portion of the hybrid memory system (e.g., hybrid memory system 204 illustrated in 2) may be allocated for use as a swap space and/or a swap device, as described above.

For example, the controller (e.g., controller 206 illustrated in FIG. 2) associated with the hybrid memory system may be configured to allocate the portion of the hybrid memory system for use as a swap space and/or swap device. The portion of the hybrid memory system that is allocated for use as a swap space and/or swap device may be allocated at initialization of the computing system (e.g., at startup, reboot, etc.), or may be allocated dynamically during operating of the computing system (e.g., during runtime of the computing system), or may be allocated during manufacture of the hybrid memory system (e.g., prior to an end user purchasing the computing system or hybrid memory system).

The allocated portion of the hybrid memory system may be one or more pages of memory, one or more LBAs, and/or one or more blocks of memory. For example, the controller may be configured to allocate a particular LBA range of the hybrid memory system for use as a swap space and/or swap device. In some embodiments, the portion of the hybrid memory system that is allocated for use as a swap space and/or swap device may be a portion of the memory resource (e.g., memory resource 208-1, 208-N, etc. illustrated in FIG. 2) that exhibits a lowest access time among the memory resources of the hybrid memory system. For example, the portion of the hybrid memory system that is allocated for use as a swap space and/or swap device may be a portion of a memory resource (e.g., memory resource 208-1 illustrated in FIG. 2) of the hybrid memory system that is an emerging memory system as described above in connection with FIG. 2.

When multiple virtual addresses are mapped to a same physical memory address, the computing system may experience decreased performance and/or may hang (e.g., processes may be terminated and/or may behave unexpectedly).

By allocating a portion of the hybrid memory system as a swap space and/or swap device, pages of data may be transferred between the host and the hybrid memory system to alleviate the performance decreases associated with concurrent calls to multiple virtual addresses that are mapped to a same physical memory address as described in further detail in connection with block 424 below.

At block 424, the computing system and/or the controller may be configured to cause data to be selectively transferred to the allocated portion of the hybrid memory system. For example, pages of data such as anonymous pages may be transferred from the host (e.g., the main memory of the host) to the allocated portion of the hybrid memory system. Embodiments are not limited to transferring pages of data and, in some embodiments, blocks of data and/or data corresponding to a particular LBA range of the hybrid memory system may be selectively transferred from the hybrid memory system to the host. As described above, the data may be transferred as part of a swap operation and may therefore be transferred back to the host from the hybrid memory system if the data is subsequently referenced by the host.

By selectively transferring data (e.g., pages of data, blocks of data, LBA ranges, etc.) improved performance of the computing system may be realized. For example, by allocating portions of the hybrid memory system that correspond to memory resources that are emerging-type memory resources and subsequently selectively transferring data between the host and the hybrid memory system as part of a swap operation, memory endurance may be increased and/or an amount of time associated with performing a swap operation may be reduced in comparison to approaches that do not utilize a hybrid memory system and/or in comparison to approaches in which one or more of the memory resources is not an emerging-type memory resource.

Figure 5A:
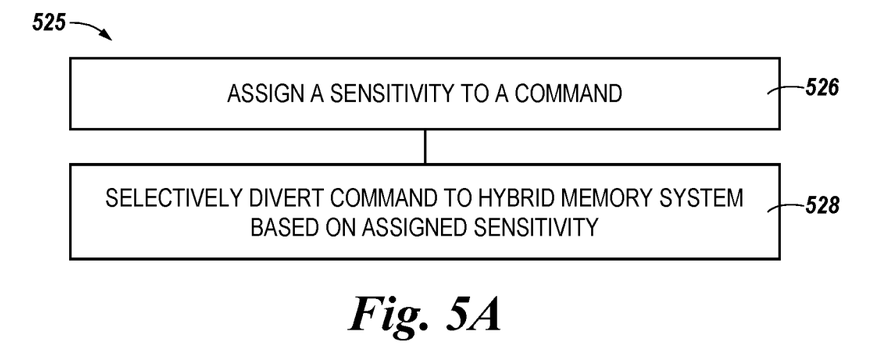
FIG. 5A illustrates an example flow diagram to selectively divert commands to a hybrid memory system in accordance with a number of embodiments of the present disclosure.

FIG. 5A illustrates an example flow diagram 525 to selectively divert commands to a hybrid memory system in accordance with a number of embodiments of the present disclosure. At block 526, a sensitivity can be assigned to a command. In some embodiments, the sensitivity can be assigned to the command by the controller (e.g., controller 206 illustrated in FIG. 2). As described above in connection with FIG. 2, the controller may be configured to determine the sensitivity of the command based characteristics of the command traffic such as the frequency of execution of a particular command, the size of the command, the amount of resources execution of the command consumes, the speed at which the command may be executed, or other suitable sensitivity characteristics.

In some embodiments, the controller may be configured to apply an indicator to the command to indicate the determined sensitivity of the command. For example, the controller may append an indication to the command based on the determined sensitivity of the command. The indicator may be a flag or digit having a specific value appended to the command; however, embodiments are not so limited, and the indicator may be a sequence of digits appended to the command or other suitable indicator that allows the controller to determine whether the command is to be diverted to the hybrid memory system or not.

At block 528, the command may be selectively diverted to the hybrid memory system. In some embodiments, the command may be selectively diverted to the hybrid memory system based on the assigned sensitivity of the command. For example, the controller may be configured to determine the assigned sensitivity of the command and selectively divert the command to the hybrid memory system based on the sensitivity assigned to the command. Once the controller has appended the indicator to a command, the command may be selectively diverted to an appropriate memory location of the computing system. For example, command traffic that is repetitive, random, and/or frequently executed (such as the synchronous small frequent and random writes incurred by the journaling system during operation of the computing system), may be selectively diverted to the hybrid memory device.

As an example, the controller may be configured to determine that the command has a particular indicator corresponding to the assigned sensitivity appended thereto. For instance, the controller may determine that the indicator appended to the command corresponds to a command with a high sensitivity (e.g., a command that is repetitive, random, and/or frequently executed), and may subsequently cause that command to be selectively diverted to the hybrid memory system. In contrast, the controller may determine that the indicator appended to the command corresponds to a command with a low sensitivity (e.g., a command that is not repetitive, random, and/or frequently executed), and may take no action (e.g., may not cause the command to be selectively diverted to the hybrid memory system) with respect to the command that has the indicator indicating a low sensitivity appended thereto.

As described above in more detail in connection with FIG. 2, by selectively diverting certain portions of the command traffic to the hybrid memory system, lower latencies and/or increased performance may be realized in comparison to approaches in which the command traffic is either not selectively diverted or in approaches in which the command traffic is handled by a flash based memory system.

Figure 5B:
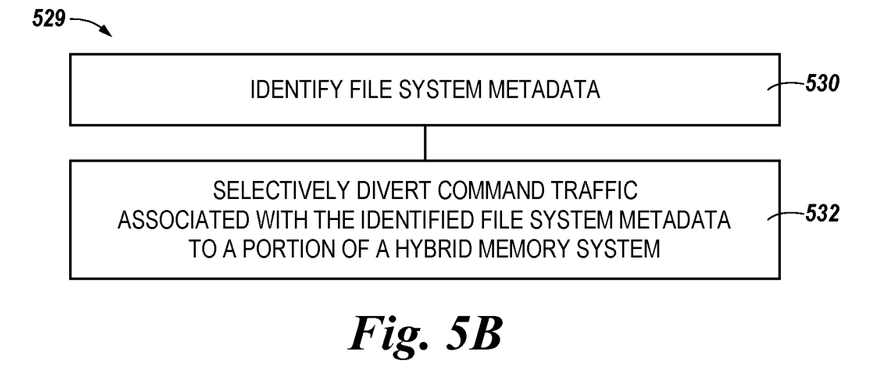
FIG. 5B illustrates an example flow diagram to selectively divert command traffic to a hybrid memory system in accordance with a number of embodiments of the present disclosure.

FIG. 5B illustrates an example flow diagram 529 to selectively divert command traffic to a hybrid memory system in accordance with a number of embodiments of the present disclosure. At block 530, file system metadata may be identified. In some embodiments, the file system metadata may be identified by the controller (e.g., controller 206 illustrated in FIG. 2). For example, as described above in connection with FIG. 2, the controller may be configured to identify command traffic that is characterized by multiple small, random writes such as command traffic that corresponds to metadata updates applied to the file system.

In some embodiments, the controller may be configured to identify the command traffic that corresponds to metadata updates by identifying data structures that correspond to metadata. For example, metadata may be identified based on the type of data structures in which the metadata is organized. By identifying data structures that correspond to types of data structures in which metadata is organized, the controller may identify command traffic that corresponds to the metadata. Once the controller has identified command traffic that corresponds to metadata, the controller may be further configured to identify when metadata updates are applied to the file system. In some embodiments, the controller may be configured to identify that the file system has been (or is being) updated based on a determination that metadata associated with the file system is updated and applied to the file system.

The controller may be configured to identify an indicator corresponding to command traffic corresponding to file system update traffic such as metadata updates that are applied to the file system in response to a file update. The indicator may be a flag or digit having a specific value appended to the command traffic; however, embodiments are not so limited, and the indicator may be a sequence of digits appended to the command traffic or other suitable indicator that allows the controller to determine whether the command traffic is to be diverted to the hybrid memory system or not.

At block 532, command traffic associated with the identified file system metadata may be selectively diverted to a portion of the hybrid memory system. In some embodiments, the controller may be configured to cause the command traffic associated with the identified file system metadata to be selectively diverted to a portion of the hybrid memory system. The controller may be configured to cause the command traffic associated with the identified file system metadata to be selectively diverted to a portion of the hybrid memory system based on the indicator appended to command traffic corresponding to file system update traffic such as metadata updates that are applied to the file system in response to a file update.

Similar to the description of FIG. 4, herein, a portion of the hybrid memory system may be allocated for use in selectively diverting the command traffic associated with the identified file system metadata at manufacture of the computing system or during operation of the computing system. In some embodiments, the portion of the hybrid memory system may be one or more pages of memory, one or more LBAs, and/or one or more blocks of memory. For example, the controller may be configured to allocate a particular LBA range of the hybrid memory system to which the command traffic associated with the identified file system metadata is to be diverted. In some embodiments, the portion of the hybrid memory system may be a portion of the memory resource (e.g., memory resource 208-1, 208-N, etc. illustrated in FIG. 1) that exhibits a lowest access time among the memory resources of the hybrid memory system. Accordingly, in some embodiments, latencies of the computing system may be reduced as compared to some approaches in which command traffic corresponding to file system metadata updates is not selectively diverted to a hybrid memory system.

Figure 5C:
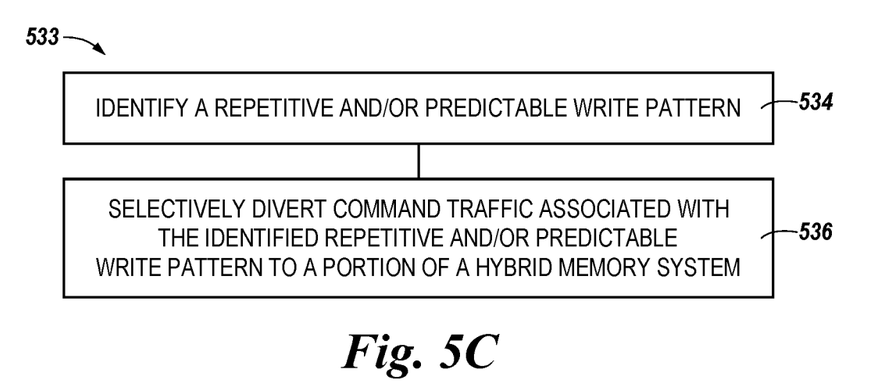
FIG. 5C illustrates an example flow diagram to selectively divert command traffic with an identified write pattern to a hybrid memory system in accordance with a number of embodiments of the present disclosure.

FIG. 5C illustrates an example flow diagram 533 to selectively divert command traffic with an identified write pattern to a hybrid memory system in accordance with a number of embodiments of the present disclosure. At block 534, a repetitive and/or predictable write pattern may be identified. The predictable and/or repetitive write pattern corresponding to certain command traffic may be identified by the controller (e.g., controller 206 illustrated in FIG. 2).

For example, during operation of the computing system, certain file systems (e.g., virtual file system 112 illustrated in FIG. 1, file system 113 illustrated in FIG. 1) may exhibit repetitive and/or predictable write patterns. For example, F2FS checkpoints and/or the journaling system may repeatedly write certain commands and/or data in a predictable manner. These commands and/or data may be written in small random writes, as described above.

In some embodiments, the controller may be configured to identify these repetitive and/or predictable write patterns by providing a tighter coupling between the kernel and the memory (e.g., the main memory and/or the hybrid memory system) of the computing device. For example, in some embodiments, the controller may access one or more semantic portions of the computing system, which may allow for the controller to identify repetitive and/or predictable write patterns that occur during operation of the computing system.

Once command traffic corresponding to repetitive and/or predictable write patterns is identified by the controller, the controller may be configured to identify an indicator to command traffic that exhibits predictable and/or repetitive write patterns. The indicator may be a flag or digit having a specific value appended to the command traffic; however, embodiments are not so limited, and the indicator may be a sequence of digits appended to the command traffic or other suitable indicator that allows the controller to determine whether the command traffic is to be diverted to the hybrid memory system or not.

At block 536, the command traffic associated with the repetitive and/or predictable write pattern may be selectively diverted to the hybrid memory system or a portion thereof. As previously described, a portion of the hybrid memory system may be allocated for use in selectively diverting the command traffic associated with the repetitive and/or predictable write pattern at manufacture of the computing system or during operation of the computing system. In some embodiments, the portion of the hybrid memory system may be one or more pages of memory, one or more LBAs, and/or one or more blocks of memory. For example, the controller may be configured to allocate a particular LBA range of the hybrid memory system to which the command traffic associated with the repetitive and/or predictable write pattern is to be diverted. In some embodiments, the portion of the hybrid memory system may be a portion of the memory resource (e.g., memory resource 208-1, 208-N, etc. illustrated in FIG. 1) that exhibits a lowest access time among the memory resources of the hybrid memory system. Accordingly, in some embodiments, latencies of the computing system may be reduced as compared to some approaches in which command traffic exhibiting repetitive and/or predictable write patterns is not selectively diverted to a hybrid memory system.

Figure 5D:
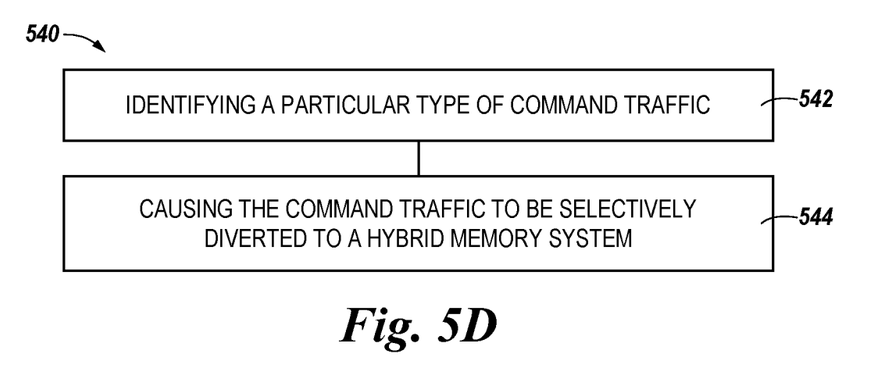
FIG. 5D illustrates an example flow diagram to selectively diverted to a hybrid memory system by an identified command characteristic.

FIG. 5D illustrates an example flow diagram 540 to selectively diverted to a hybrid memory system by an identified command characteristic. At block 542, a particular type of command traffic may be identified. For example, command traffic corresponding to file system metadata updates and/or command traffic that exhibits a repetitive and/or predictable write pattern may be identified as described above in connection with FIGS. 5B and 5C. In some embodiments, the controller may be configured to identify the particular type of command traffic.

At block 544, the command traffic may be caused to be selectively diverted to a hybrid memory system. In some embodiments, the command traffic may correspond to command traffic that is executed by a host that is coupleable to the hybrid memory system. The controller may be configured to selectively divert the command traffic to a portion of the hybrid memory system as described herein. For example, the portion of the hybrid memory system may be a portion of the memory resource (e.g., memory resource 208-1, 208-N, etc. illustrated in FIG. 1) that exhibits a lowest access time among the memory resources of the hybrid memory system. Accordingly, in some embodiments, latencies of the computing system may be reduced as compared to some approaches in which particular types of command traffic are not selectively diverted to a hybrid memory system.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:

allocating a portion of a hybrid memory system comprising a flash memory device, a resistance variable memory device, and a controller for use in a code paging operation;

determining that a fault exception corresponding to a read or write access request for a particular set of data associated with a main memory of a host coupleable to the hybrid memory system is going to occur;

performing the code paging operation in response to determining that the host will experience the fault exception; and selectively transferring the particular set of data from the host to the allocated portion of the flash memory device or the phase change random access memory device of the hybrid memory system by mapping a logical block address (LBA) associated with the main memory of the host to the flash memory device or the resistance variable memory device that is configured to exhibit a lower write latency based, at least in part, on performance of the code paging operation and a determination that executing instructions to access a portion of the main memory in which the particular set of data is maintained will cause the fault exception to occur.

2. The method of claim 1, wherein determining that the host has experienced the fault exception includes determining that a readahead operation has been performed by the host.

3. The method of claim 1, wherein selectively transferring data from the host to the allocated portion of the hybrid memory system further comprises selectively transferring the data to a particular logical block address range associated with the hybrid memory system.

4. The method of claim 1, further comprising:

determining contents of a code read by the host as part of the code paging operation; and selectively mapping portions of a memory of the host to the allocated portion of the hybrid memory system.

5. The method of claim 1, further comprising transferring the data from the allocated portion of the hybrid memory system back to the host in response to determining that the host is referencing the data.

6. An apparatus, comprising:
a hybrid memory system comprising a first non-volatile memory (NVM) resource, a second NVM resource, and a controller,
wherein the controller is configured to:
determine that an exception corresponding to a read or write access request for a particular set of data associated with a main memory of a host coupleable to the hybrid memory system is going to occur; and
cause the particular set of data to be selectively stored in the first NVM or the second NVM of the hybrid memory system by mapping a logical block address (LBA) associated with the main memory associated with the host to the one of the first NVM or the second NVM that is configured to exhibit a lower write latency based, at least in part on a determination that executing instructions to access a portion of the main memory in which the particular set of data is maintained will cause the exception to occur.

7. The apparatus of claim 6, wherein the exception comprises a page fault.

8. The apparatus of claim 6, wherein the controller is further configured to cause the data to be selectively mapped onto the LBA range of the hybrid memory system.

9. The apparatus of claim 6, wherein the determination that the exception will occur is based, at least in part, on a determination that a readahead mechanism has been invoked by the apparatus.

10. The apparatus of claim 6, wherein the controller is further configured to cause:
a determination that a readahead mechanism has been invoked by the apparatus; and
responsive to the determination that the readahead mechanism has been invoked, map the LBA range corresponding to data associated with the readahead mechanism onto a contiguous portion of the hybrid memory system.

11. The apparatus of claim 6, wherein the controller is further configured to cause the data to be selectively stored in the hybrid memory system responsive to a determination that an amount of time associated with performing an operation using the data is reduced when the data is stored in the hybrid memory system.

12. The apparatus of claim 6, wherein the controller is further configured to optimize an execution speed of the data by selectively storing the data in the hybrid memory system.

13. The apparatus of claim 6, wherein the main memory is the main memory resource of the host computing device coupled to the hybrid memory system.

14. The apparatus of claim 6, wherein the data corresponds to a page of memory, blocks of memory, logical block addresses of memory, or combinations thereof.

15. The apparatus of claim 6, wherein at least one of the first NVM and the second NVM comprises a resistance variable memory device and the other of the first NVM and the second NVM comprises a flash memory device.

16. An apparatus, comprising:
a hybrid memory system comprising a first non-volatile memory (NVM) resource, a second NVM resource, and a controller,
wherein the controller is configured to:
cause a portion of the hybrid memory system to be allocated for use in a code paging operation;
cause a portion of a memory associated with a host to be mapped to a logical block addressing (LBA) range;
cause the LBA range to be mapped to the allocated portion of the hybrid memory system;
determine that an exception corresponding to a read or write access request for a particular set of data associated with a main memory of the host coupleable to the hybrid memory system is going to occur; and
cause the particular set of data to be selectively stored in the first NVM or the second NVM of the hybrid memory system by mapping a LBA associated with the main memory of the host to the one of the first NVM or the second NVM that is configured to exhibit a lower write latency based, at least in part on performance of the code paging operation and a determination that executing instructions to access a portion of the main memory in which the particular set of data is maintained will cause the exception to occur.

17. The apparatus of claim 16, wherein the controller is further configured to cause:
contents of a code read as part of the code paging operation to be determined; and
a portion of the memory associated with the host containing the determined contents of the code read as part of the code paging process to be selectively mapped to the portion of the hybrid memory system allocated for use in the code paging operation.

18. The apparatus of claim 17, wherein the portion of the hybrid memory system comprises a particular LBA range.

19. The apparatus of claim 16, wherein the portion of the hybrid memory system corresponds to a page of the hybrid memory system, blocks of the hybrid memory system, logical block addresses of the hybrid memory system, or combinations thereof.

20. The apparatus of claim 16, wherein at least one of the first NVM resource and the second NVM resource comprises a resistance variable memory device and the other of the first NVM and the second NVM comprises a flash memory device.

21. The apparatus of claim 16, wherein the code paging operation is performed in response to a determination that an exception has occurred.

* * * * *